United States Patent [19]

Radvan et al.

[11] Patent Number: 4,978,489

[45] Date of Patent: Dec. 18, 1990

[54] PROCESS FOR THE MANUFACTURE OF A PERMEABLE SHEET-LIKE FIBROUS STRUCTURE

[75] Inventors: Bronislaw Radvan, Flackwell Heath; Anthony J. Willis, Marlow; Peter L. Wallace, Flackwell Heath, all of England

[73] Assignee: The Wiggins Teape Group Limited, Basingstoke, England

[21] Appl. No.: 361,790

[22] Filed: May 31, 1989

Related U.S. Application Data

[63] Continuation of Ser. No. 78,113, Jul. 27, 1987, abandoned.

[30] Foreign Application Priority Data

Jul. 31, 1986 [GB] United Kingdom ................ 8618729

[51] Int. Cl.⁵ ........................ B32B 5/16; B29C 43/02
[52] U.S. Cl. .................................... 264/118; 156/166; 156/296; 264/119; 264/122; 264/128; 264/137
[58] Field of Search ............... 264/122, 119, 126, 280, 264/118, 128, 137; 156/166, 296

[56] References Cited

U.S. PATENT DOCUMENTS

| | | |
|---|---|---|
| 1,875,018 | 8/1932 | Kliefoth . |
| 1,901,382 | 3/1933 | Stevenson . |
| 2,388,187 | 10/1945 | Sallé ................................ 162/164.1 |
| 2,653,870 | 9/1953 | Kast . |
| 2,715,755 | 8/1955 | Jones . |
| 2,795,524 | 6/1957 | Rodman ............................. 154/137 |
| 2,892,107 | 6/1959 | Williams et al. ....................... 310/8 |
| 2,962,414 | 11/1960 | Arledter ............................. 162/145 |
| 3,020,109 | 8/1962 | Monaco . |
| 3,137,601 | 6/1964 | Menzer . |
| 3,200,181 | 8/1965 | Rudloff . |
| 3,216,841 | 11/1965 | Thellmann ......................... 106/208 |
| 3,396,062 | 8/1968 | White ................................ 156/244 |
| 3,428,518 | 2/1969 | Schafer ............................. 264/123 |
| 3,452,128 | 6/1969 | Rains ................................ 264/122 |
| 3,489,827 | 1/1970 | Mueller et al. ...................... 264/50 |

(List continued on next page.)

FOREIGN PATENT DOCUMENTS

| | | | |
|---|---|---|---|
| 230504 | 1/1958 | Australia .......................... 162/181.4 |
| 559853 | 7/1983 | Australia . |
| 0071219 | 2/1983 | European Pat. Off. . |
| 0148760 | 7/1985 | European Pat. Off. . |
| 0148762 | 7/1985 | European Pat. Off. . |
| 0152994 | 8/1985 | European Pat. Off. . |

(List continued on next page.)

OTHER PUBLICATIONS

"Polymer Processing", James M. McKelvey, 1962.
"Paints and Varnishes—Determination of Flow Time by Use of Flow Cups", International Standard ISO 2431, 1984.
"Part A6, Determination of Flow Time by Use of Flow Cups", British Standards Institution, 1984.
"Fibre Foam", Turner & Cogswell, 1976, presented at VIIth International Congress on Rheology in Sweden, Aug. 23–Aug. 27, 1976.
Siemens AG Digest, Abstract 24 181 Q.
1004 Abstracts Bulletin of the Institute of Paper Chemistry, vol. 53 (1982), Aug., No. 2, Appleton, Wisc., U.S.A.

Primary Examiner—Mary Lynn Fertig
Attorney, Agent, or Firm—Burns, Doane, Swecker & Mathis

[57] ABSTRACT

A process for the manufacture of a stiff permeable sheet-like fibrous structure which includes forming a web with 20% to 60% single fibres having a high modulus of elasticity (as herein defined) and between 7 and 50 millimeters long, and 40% to 60% by weight of a wholly or substantially unconsolidated particulate plastics material, and then treating the web by heating to melt the plastics material and passing it between a pair of nip rollers so that the plastics material can flow and wet out the fibres, the nip between the rollers being set to a dimension less than the thickness of the unconsolidated web and greater than that of the web if it were to be fully consolidated, and allowing the web to expand and remain substantially permeable after passing through the rollers.

23 Claims, 1 Drawing Sheet

U.S. PATENT DOCUMENTS

| Number | Date | Name | Class |
|---|---|---|---|
| 3,494,824 | 1/1970 | Roberts | 162/152 |
| 3,560,294 | 2/1971 | Potkanowicz . | |
| 3,573,158 | 3/1971 | Pall et al. | 162/131 |
| 3,607,500 | 9/1971 | Field | 264/119 |
| 3,621,092 | 11/1971 | Hofer . | |
| 3,734,985 | 5/1973 | Greenberg . | |
| 3,832,115 | 8/1974 | Ettel | 425/373 |
| 3,837,986 | 9/1974 | Gorter et al. . | |
| 3,850,723 | 11/1974 | Ackley | 156/180 |
| 3,856,614 | 12/1974 | Susuki et al. | 156/79 |
| 3,865,661 | 2/1975 | Hata et al. | 156/79 |
| 3,873,336 | 3/1975 | Lambert et al. | 106/306 |
| 3,891,738 | 6/1975 | Shen . | |
| 3,897,533 | 7/1975 | Hani et al. | 264/137 |
| 3,903,343 | 9/1975 | Pfaff | 428/168 |
| 3,930,917 | 1/1976 | Esakov et al. | 156/78 |
| 3,975,483 | 12/1976 | Rudloff . | |
| 3,980,511 | 9/1976 | Proucelle | 156/79 |
| 3,980,613 | 9/1976 | Bachot et al. | 264/45.3 |
| 4,007,083 | 2/1977 | Ring et al. | 162/101 |
| 4,081,318 | 3/1978 | Wietsma | 162/157 R |
| 4,104,340 | 8/1978 | Ward | 264/6 |
| 4,104,435 | 8/1978 | Ballesteros | 428/288 |
| 4,153,760 | 5/1979 | Sundberg et al. | 264/45.3 |
| 4,159,294 | 6/1979 | Oishi et al. | 264/45.3 |
| 4,178,411 | 12/1979 | Cole et al. . | |
| 4,234,652 | 11/1980 | Vanoni et al. . | |
| 4,242,404 | 12/1980 | Bondoc et al. . | |
| 4,273,981 | 6/1981 | Nopper et al. . | |
| 4,286,977 | 9/1981 | Klein | 55/521 |
| 4,327,164 | 4/1982 | Feinberg et al. | 429/144 |
| 4,339,490 | 7/1982 | Yoshioka et al. | 428/213 |
| 4,359,132 | 11/1982 | Parker et al. | 264/119 |
| 4,362,778 | 12/1982 | Andersson et al. . | |
| 4,383,154 | 7/1983 | Tyler et al. | 524/12 |
| 4,386,943 | 7/1983 | Gumbel et al. . | |
| 4,399,085 | 8/1983 | Belbin et al. . | |
| 4,426,470 | 1/1984 | Wessling et al. . | |
| 4,440,819 | 3/1984 | Rosser et al. . | |
| 4,451,539 | 5/1984 | Vallee et al. | 428/515 |
| 4,469,543 | 9/1984 | Segal et al. | 156/283 |
| 4,481,248 | 11/1984 | Fraige | 428/283 |
| 4,495,238 | 1/1985 | Adiletta . | |
| 4,498,957 | 2/1985 | Sasaki et al. . | |
| 4,503,116 | 3/1985 | Lapidus | 428/286 |
| 4,508,777 | 4/1985 | Yamamoto et al. . | |
| 4,512,836 | 4/1985 | Tucci . | |
| 4,543,288 | 9/1985 | Radvan et al. . | |
| 4,562,033 | 12/1985 | Johnson et al. . | |
| 4,568,581 | 2/1986 | Peoples | 264/122 |
| 4,595,617 | 6/1986 | Bogdany | 428/95 |
| 4,643,940 | 2/1987 | Shaw et al. | 428/308.4 |
| 4,649,014 | 3/1987 | Tochikawa | 264/126 |
| 4,659,528 | 4/1987 | Plowman et al. | 264/49 |
| 4,663,225 | 5/1987 | Farley et al. | 264/122 |
| 4,670,331 | 6/1987 | Radvan et al. . | |
| 4,690,860 | 9/1987 | Radvan et al. | 428/290 |
| 4,719,039 | 1/1988 | Leonardi | 264/45.3 |
| 4,734,321 | 3/1988 | Radvan et al. | 428/283 |

FOREIGN PATENT DOCUMENTS

| Number | Date | Country |
|---|---|---|
| 0173382 | 3/1986 | European Pat. Off. . |
| 3420195 | 12/1985 | Fed. Rep. of Germany . |
| 1040359 | 10/1953 | France . |
| 1529133 | 6/1968 | France . |
| 2475970 | 8/1981 | France . |
| 56-37373 | 4/1981 | Japan . |
| 462024 | 10/1968 | Switzerland . |
| 448138 | of 1936 | United Kingdom . |
| 703023 | 1/1954 | United Kingdom . |
| 729381 | 5/1955 | United Kingdom . |
| 843154 | 8/1960 | United Kingdom . |
| 855132 | 11/1960 | United Kingdom . |
| 871117 | 6/1961 | United Kingdom . |
| 1008833 | 11/1965 | United Kingdom . |
| 1058932 | 2/1967 | United Kingdom . |
| 1110659 | 4/1968 | United Kingdom . |
| 1129757 | 10/1968 | United Kingdom . |
| 1134785 | 11/1968 | United Kingdom . |
| 1198324 | 7/1970 | United Kingdom . |
| 1204039 | 9/1970 | United Kingdom . |
| 1230789 | 5/1971 | United Kingdom . |
| 1231937 | 5/1971 | United Kingdom . |
| 1113792 | 2/1972 | United Kingdom . |
| 1263812 | 2/1972 | United Kingdom . |
| 1302829 | 1/1973 | United Kingdom . |
| 1306145 | 2/1973 | United Kingdom . |
| 1329409 | 9/1973 | United Kingdom . |
| 1330485 | 9/1973 | United Kingdom . |
| 1348896 | 4/1974 | United Kingdom . |
| 1412642 | 11/1975 | United Kingdom . |
| 1424682 | 2/1976 | United Kingdom . |
| 2051170 | 1/1981 | United Kingdom . |
| 2065016 | 6/1981 | United Kingdom . |
| 2093474 | 9/1982 | United Kingdom . |
| 2096195 | 10/1982 | United Kingdom . |

PROCESS FOR THE MANUFACTURE OF A PERMEABLE SHEET-LIKE FIBROUS STRUCTURE

This application is a continuation of application Ser. No. 07/078,113, filed July 27, 1987, now abandoned.

This invention relates to a process for the manufacture of a permeable sheet-like fibrous structure and to fibrous structures made by the process.

European patent application Ser. No. 85300031.3 (European Publication No. 0 148 760) discloses a process for making sheet-like fibrous structures in which a web comprising single fibers of particular proportions and unconsolidated particulate plastics material are treated to bond the fibers and plastics material together. The material can either be taken for reeling or consolidated by passing it through a continuous hot double belt press of, for example, the steel band type. This may be used to consolidate material received directly from the drying tunnel or material which has already been reeled.

Examples of the processes include the use of a paper making technique to manufacture the wet laid fiber reinforced plastics web. Products made by this technique are porous and enable a through dryer to be used for drying the web. At this stage the web consists of a matrix of single reinforcing fibers with thermoplastic powder dispersed within this fiber matrix. A binder may be applied prior to drying the web to facilitate handling. Preferably however, where the plastics material is a thermoplastic the dryer is used to pass hot gases through the web so as to cause the thermoplastic powders partially to melt and adhere to the fibers. This produces a porous web which may be rigid, or alternatively flexible, depending on the degree of heating. However, it is still susceptible to damage and loss of fibers, thermoplastic powder and fine material such as additives, unless handled with care. The material at this stage may be despatched to the moulded in a reeled form or subjected to hot pressing and cooling in a continuous steel band or a discontinuous press to produce a fully consolidated nonporous sheet.

The use of a continuous double belt press is expensive, and of a discontinuous press time consuming. Furthermore, a fully consolidated sheet can be disadvantageous for certain subsequent processes. The present invention aims to provide a method of forming a stiff porous permeable sheet-like fibrous structure without the use of such presses.

According to the present invention a process for the manufacture of a stiff permeable sheet-like fibrous structure includes forming a web with 20% to 60% single fibers having a high modulus of elasticity (as herein defined) and between 7 and 50 mm long, and 40% to 60% by weight of a wholly or substantially unconsolidated fibrous or particulate thermoplastics material and then treating the web by heating to melt the plastics material and passing it between a pair of nip rollers so that the plastics material can flow and wet out the fibers, the nip between the rollers being set to a dimension less than that of the unconsolidated web and greater than that of the web if it were to be fully consolidated, and allowing the web to expand and remain substantially permeable after passing through the rollers. Preferably the nip is set to a dimension 5% to 10% greater than that of the web if it were to be fully consolidated.

Preferably the fibers are in the form of single discrete fibers. Thus where glass fibers are used and are received in the form of chopped strand bundles, the bundles are broken down into single fibers before the structure is formed.

A high modulus of elasticity is to be taken as meaning a modulus of elasticity substantially higher than that of a consolidated sheet which could be formed from the structure. Fibers falling into this category include glass, carbon and ceramic fibers and fibers such as the aramid fibers sold under the trade names Kevlar and Nomex and will generally include any fiber having a modulus higher than 10,000 Mega Pascals.

Particulate plastics material is to be taken as including short plastics fibers which may be included to enhance the cohesion of the structure during manufacture.

Bonding may be effected by utilizing the thermal characteristics of the plastics material within the structure. Thus the structure may be heated sufficiently to cause a thermoplastic component to fuse at its surfaces to adjacent particles and fibers. Or a post formable thermosetting component may be so heated to produce a similar effect. Care must be taken however to ensure that the conditions of heating are such as to prevent degradation of the plastics material after bonding.

Individual fibers should not be shorter than about 7 millimeters, since shorter fibers do not provide adequate reinforcement in the ultimate moulded article. Nor should they be longer than 50 millimeters since such fibers are difficult to handle in the preferred manufacturing process for the fibrous structure.

Preferably where glass fibers are used in order to confer structural strength they are 13 microns in diameter or less. Fibers of diameter greater than 13 microns will not so efficiently reinforce the plastics matrix after moulding.

Preferably, the thermoplastics material is in a particulate form. Suitable thermoplastics include polyethylene, polypropylene, polystyrene, acrylonitrylstyrene, butadiene, polyethyleneterephthalate, polybutyleneterephthalate, polybutyleneterachlorate, and polyvinyl chloride, both plasticised and unplasticised, or blends of these materials with each other or other polymeric materials. Other suitable thermoplastics include polyphenylene ether or polycarbonates or polyestercarbonates or thermoplastic polyesters or polyetherimides or acrylonitrile—butylacrylate—styrene polymers or amorphouse nylon or polyarylene ether ketone or alloys and blends of these materials with each other or other polymeric materials. It is anticipated that any thermoplastics powder may be used which is not chemically attacked by water and which can be sufficiently softened by heat to permit fusing and/or moulding without being chemically decomposed.

Plastics powders need not be excessively fine, but particles coarser than about 1.5 millimeters, as exemplified by coarse sand or fine rice grains, are unsatisfactory in that they do not flow sufficiently during the moulding process to produce a homogenous structure. The use of larger particles results in a significant reduction in the flexural modulus of the material when consolidated. Preferably the plastics particles are not more than 1 millimeter in size.

Because the structure is permeable, it is capable of being preheated by hot air permeation, as described in European patent application No. 85300033.9 (European Publication No. 0 148 762). This technique permits rapid homogenous heating of the whole structure in a manner which is difficult to achieve with consolidated sheets, and the subject matter disclosed in that application is incorporated by reference herein.

The porosity of the structure permits the subsequent introduction of liquid thermosetting resin by surface coating or impregnation. Such resins must, of course, be of the slow curing or post formable kind so as to permit delivery to the moulder and moulding before curing occurs. Typically, the moulder will first rapidly heat the thermoplastic component. The sheet will then be quickly transferred to the moulding press and pressed into the desired shape before the curing of the thermosetting resin is complete.

The impregnation may be complete, in which case a dense article will result or it may be limited to the surface layers of the article. This may confer sufficient increase in stiffness over the original expanded thermoplastic, together with a sealed surface which prevents a further ingress of other fluids such as water or oil into the expanded central zone. An excess of liquid thermosetting materials on the surface may also be used to produce a very smooth glossy appearance which is desirable when the moulding is to be used as a substitute for sheet metal and which is very difficult to achieve with conventional fiber reinforced materials.

Thermosetting resins which may be used to impregnate the expanded thermoplastics sheet include phenolic and polyester resins, for example phenolformaldehyde resin, urea and melamine formaldehyde resins, epoxy resins, unsaturated polyesters and polyurethanes. Post formable thermosetting materials may also be used.

In those cases where the moulder is only equipped to handle consolidated sheets, the fibrous structure may be consolidated by cutting into appropriate lengths and then heating and cooling under pressure. It will be appreciated that such consolidation can only be carried out when the plastics content of the sheet is wholly of thermoplastics material.

All of the above features are recognizable from European patent application No. 85300031.3 (European Publication No. 0 148 760) and are relevant to the present invention, and the subject matter disclosed in that application is incorporated by reference herein.

Preferably the heat of the nip rolls is controlled to maintain them at a temperature below the plastics material melt temperature. One of the nip rolls may be driven at a speed equal to or faster than the web feed speed.

Preferably, the invention includes passing the web, before it cools, through a further pair of nip rolls with a larger gap to meter the web and improve the surface finish.

The invention has use with fiber reinforced thermoplastic where the dry material is too weak to be handled conveniently so that it requires the use of binders or a short residence time under heat and pressure to achieve fiber wetting by the molten polymer and to become partially consolidated to a manageable form.

The invention can be performed in various ways and will now be described by way of example with reference to the accompanying drawings, in which FIG. 1 is a semi-diagrammatic sectional end elevation of an apparatus for carrying out the process of the invention;

As a starting material for the process of the invention, any permeable resilient fibrous sheet may be used which will recover at least partly to its original uncompressed condition after compression, and which embodies a plastics material capable of wetting the surfaces of the constituent fibers of the sheet.

The preferred material for use in the process of the invention comprises 20% to 60% by weight of reinforcing fibers having a high modulus of elasticity (as herein defined), and being between about 7 and about 50 millimeters long, and 40% to 80% by weight of wholly or substantially unconsolidated plastics material, and in which the plastics components are bonded into a flexible air permeable sheet-like structure.

A high modulus of elasticity is to be taken as meaning a modulus of elasticity substantially higher than that of a consolidated sheet which could be formed from the structure. Fibers falling into this category include glass, carbon and ceramic fibers and fibers such as the aramid fibers sold under the trade names Kevlar and Nomex and will generally include any fiber having a modulus higher than 10,000 Mega Pascals.

A process for producing a material of the foregoing kind is disclosed in European patent application Ser. No. 85300031.3 (European Publication No. 0 148 760) which also proposes the compression of such material under heat and pressure, so that after cooling, an impermeable consolidated sheet is formed. It is preferred for process of the present invention to use the material made according to European patent application Ser. No. 85300031 3 in an impermeable unconsolidated state However consolidated material can also be treated according to the process of the invention after suitable preheating.

Figure 1:
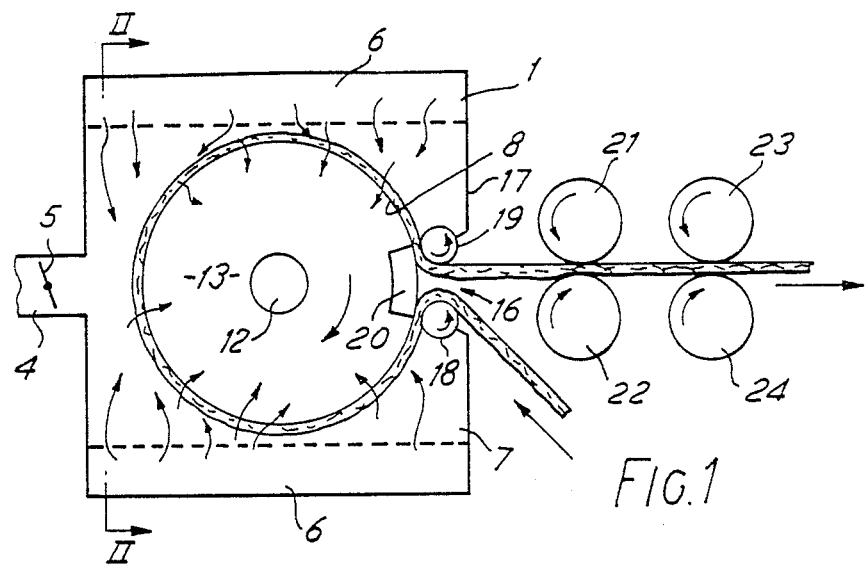
Figure 2:
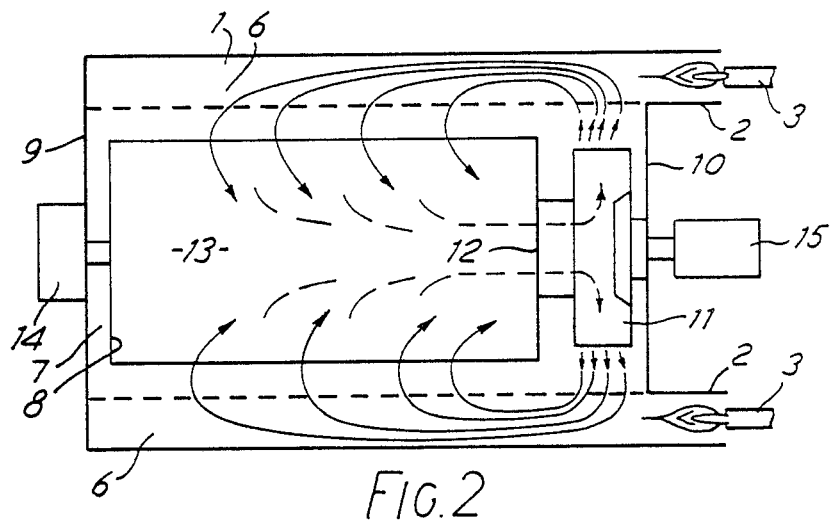
FIG. 2 is a view on the line II—II of FIG. 1.

Referring to FIGS. 1 and 2 of the drawings, these show a heater casing 1 having inlet ducts 2 in which gas fired burners 3 are located, and an outlet duct 4 controlled by a butterfly valve 5.

Within the casing 1, the ducts 2 open into plenum chambers 6 having perforated side walls through which air can freely pass to a central chamber 7.

Within the central chamber 7, a perforated drum 8 is mounted for rotation in bearings (not shown) carried in the end walls 9 and 10 of the casing 1. A radially discharging fan 11 is mounted co-axially with the drum 8 at the end of the casing 1 at which the burners 3 are located. The inlet 12 of the fan 11 is connected to the core zone 13 of the drum 8 and the fan 11 discharges into the plenum chambers 6 immediately in front of the burners 3. The drum 8 and fan 11 are driven independently by variable speed drives 14 and 15 respectively.

An opening 16 is provided in the front wall 17 of the casing 1, with inlet and outlet guide rollers 18 and 19 respectively located immediately below and above the opening. An internal baffle 20 is located within the drum adjacent to the opening 16 so as to limit loss of heated air from the casing.

Two pairs of cold steel nip rollers 21/22 and 23/24 are located outwardly of the opening 16.

In using the apparatus of FIGS. 1 and 2 to carry out the process of the invention, a permeable sheet 25 of material comprising reinforcing fibers and plastics material, for example of the preferred kind specified above, is fed over the inlet guide roller 18. The sheet 25 then passes around the drum 8 and out of the casing 1 over the outlet guide roller 19. During its passage through the central chamber 7 as the drum 8 rotates, hot air is circulated through the drum by the fan 11 via the plenum chambers 6, the desired temperature being maintained by the burners 3. Venting of excess air through vent 4 is controlled by butterfly valve 5.

The temperature of the air in the casing 1 is maintained at a level which will raise the plastic content of the sheet to its melt temperature. The sheet is then passed between the two steel nip rollers 21 and 22, the gap between the rollers being set between 5% and 10% greater than the thickness of the web when fully consolidated. The steel rollers are of approximately 25 cm diameter and may be temperature controlled by water spraying or other means to maintain them at a temperature below the polymer melt temperature. At least one roller is driven at a speed equal to or slightly faster than the web feed speed of the web from the drier because of the increase in web speed which results from compression of the nip.

The action of passing the molten web through the roll nip causes the molten polymer globules to flow and wet out the fibers, this produces a strong network of fibers and polymer. Any fine powder additives within this network are to a large extent trapped and do not fall out.

When leaving the roll nip the web 25 is still above the polymer melt temperature so upon being released from the nip, the material re-expands due to the relaxation of the stresses imposed on the individual glass fibers at the nip. A second pair of similar rollers 23 and 24 with a larger gap are provided in order to meter the webs and improve the smoothness of the surface before the sheet cools and becomes rigid.

The resulting stiff expanded and porous sheet passes to a cutting station (not shown) where it can be cut into boards of convenient size. The boards may then be reheated by passing a hot gas through the porous board and press moulding into the required shape, for example in the manner set forth in European patent application Ser. No. 85300033.9 (European Publication No. 0 148 762). Alternatively, the sheet may be used to form flat boards for which purpose, the starting material will have been manufactured with a substantial content of a thermosetting powder. In this case the sheet is merely pressure moulded before the thermosetting material cures. Or the sheet may be impregnated with a liquid thermosetting resin, as proposed in European patent application Ser. No. 85300035.4 (European Publication No. 0 152 994) and cured in a flat or moulded condition. The subject matter disclosed in European patent application Ser. No. 85300035.4 (0 152 994) is incorporated by reference herein.

In an example of the strength improvement and porosity of a nip roll treated fiber glass reinforced thermoplastic sheet, a glass fiber reinforced polypropylene dry web made by the process set forth in European patent application Ser. No. 85300031.3 (0 148 760) was used in which the glass percentage was 25 ww and the basis weight was 4,000 GSM.

The pre-dried material was fed into a rotary through heater, as shown in FIG. 1, which passed hot air at 210° C. through the porous web heating it to around 200° C. This hot web having a thickness of approximately 10 mm was fed into the ingoing nip of a two roll calendar driven at a speed similar to the heater (4.5 meters per minute). The first set of steel rolls 21 and 22 were 25 cm in diameter with the nip being set to 3.5 mm (sufficient to fully consolidate the structure). After release from the rolls 21 and 22, the resilience of the fibers in the still hot web cause the sheet to re-expand to about 9 mm in thickness. A second set of steel rolls 23 and 24 metered the web to the required finished thickness as it cooled. The porosity of the finished sheet will depend on the final metered thickness.

Samples were taken before and after heating and after the nip rolls 21 and 22 and the comparable physical properties are set out in Table 1, except for porosity, which is set out in Table 2.

TABLE 1

|  | Cross Machine | Machine Direction | Geometric Mean |
| --- | --- | --- | --- |
| Flexural Modulus Mega Pascals | | | |
| Before heating | <1 | <1 | <1 |
| Heated only | 17.1 | 25.4 | 20.8 |
| Heated and nip rolled | 829 | 1121 | 964 |
| Peak Flexural Strength Mega Pascals | | | |
| Before heating | too low to measure | | |
| Heated only | 0.78 | 1.08 | 0.919 |
| Heated and nip rolled | 17.85 | 22.4 | 19.9 |
| Specific Bending Stiffness (Newtonmillimeters) | | | |
| Before heating | too low to measure | | |
| Heated only | 58000 | 89000 | 72000 |
| Heated and nip rolled | 749000 | 1037000 | 881000 |
| Impact (Yarsley falling dart) | | Heated only | Heated and nip rolled |
| Heated only- | | | |
| Peak Force (Newtons) | | 2000 | 5000 |
| Peak energy (Joules) | | 15 | 22 |
| Fail energy (Joules) | | 30 | 65 |
| Thickness millimeters | | 15 | 10 |

TABLE 2

| | Air flow (meters/second) | |
| --- | --- | --- |
| Pressure Drop millimeters water column | through heated | through heated and roll nipped |
| 20 | 1 | 0.9 |
| 50 | 1.9 | 1.75 |
| 80 | 2.7 | 2.5 |
| 110 | 3.1 | 3 |
| 140 | 3.5 | 3.3 |
| 170 | 4 | 3.9 |
| 200 | 4.5 | 4.2 |
| 230 | 4.9 | 4.6 |

Figure 3:
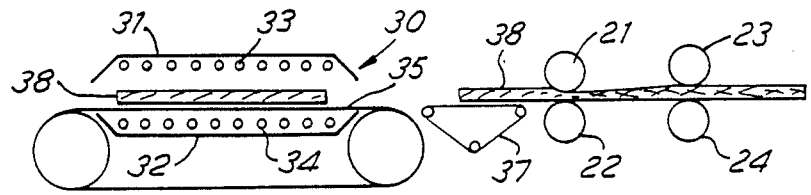
FIG. 3 is a side elevation of a modified form of apparatus for carrying out the invention.

Referring now to FIG. 3, this shows an apparatus for producing a similar end product to the apparatus of FIGS. 1 and 3, but using a different starting material in the form of a consolidated sheet consisting of resilient reinforcing fibers dispersed in a solid thermoplastic matrix.

Since the consolidated sheet is impermeable, through air heating cannot be used. An infra red oven 30 is therefore provided, consisting of upper and lower housings 31 and 32 for heating elements 33 and 34 respectively. A heat resistant endless conveyor belt 35, for example of steel mesh, passes between the elements 33 and 34, and is carried on rollers 36.

At the end of the conveyor belt 35, an idler conveyor 37 is provided to bridge the gap between the belt 35 and the two pairs of rollers 21/22 and 23/24, which are identical in form and operation to those of FIGS. 1 and 2, and will not be further described.

In operation, a consolidated sheet 38 is placed on the conveyor belt 35, moved into the infra red over, heated until the thermoplastic is molten, and then passed through the two sets of rollers 21/22 and 23/24

It will be appreciated that the fibers will already have been wetted by the plastic when a consolidated sheet is used as a starting material The use of the nip and metering rollers however, ensures that the structure is homogeneous and porous for future use.

We claim:

1. A process for the manufacture of a stiff permeable sheet-like fibrous structure suitable for through air heating and molding which includes forming a web with 20% to 60% single fibers having a high modulus of elasticity and between 7 and 50 millimeters long, and 40% to 60% by weight of a wholly or substantially unconsolidated particulate plastics material, and then treating the web by heating to melt the plastics material and passing it between a pair of nip rollers so that the plastics material can flow and wet out the fibers, the nip between the rollers being set to a dimension less than the thickness of the unconsolidated web and grater than that of the web if it were to be fully consolidated, and allowing the web to expand and remain substantially permeable after passing through the rollers.

2. A process as claimed in claim 1 in which nip is set to a dimension 5% to 10% greater than the thickness of the web if it were to be fully consolidated.

3. A process as claimed in claim 1 in which the fibers are in the form of single discrete fibers.

4. A process as claimed in claim 1 in which the web comprises a thermoplastic component and in which the structure is heated sufficiently to cause said thermoplastic component to fuse at its surfaces to adjacent particles and fibers.

5. A process as claimed in any claim 1 in which the web comprises a post formable thermosetting component, and in which said post formable thermosetting component is heated to cause it to fuse at its surfaces to adjacent particles and fibers.

6. A process as claimed in claim 1 in which the individual fibers are not shorter than about 7 millimeters.

7. A process as claimed in claim 1 in which the individual fibers are not longer than 50 millimeters.

8. A process as claimed in claim 1 in which the individual fibers are 13 microns in diameter or less.

9. A process as claimed in claim 1 in which the thermoplastics material is in a particulate form.

10. A process as claimed in claim 9 in which the particulate thermoplastics material is inert to water and can be softened by heat sufficiently to permit fusing and/or moulding without thermal degradation.

11. A process as claimed in claim 10 in which the thermoplastic particles are not more than 1.5 millimeters in size.

12. A process as claimed in claim 11 in which the thermoplastics particles are not more than 1 millimeter in size.

13. A process as claimed in claim 1 in which the thermoplastics material is polyethylene, polypropylene, polystyrene, acrylonitrylstyrene, butadiene, polyethyleneterephthalate, polybutyleneterephthalate, polyvinylchloride, both plasticised and unplasticised, or blends including these materials.

14. A process as claimed in claim 1 in which the thermoplastics material is polyphenylene, ether or polycarbonates or polyestercarbonates or thermoplastic polyesters or polyetherimides or acrylonitrile-butylacrylate-styrene polymers or amorphous nylon or polyarylene ether ketone or alloys or blends including these materials.

15. A process as claimed in claim 1 in which the structure is preheated by hot air permeation.

16. A process as claimed in claim 1 in which the structure is subsequently surface coated or impregnated with a thermosetting resin.

17. A process as claimed in claim 16 in which the thermoplastic structure is heated, transferred to a moulding press and pressed to the desired shape before curing of the thermosetting resin is completed.

18. A process as claimed in claim 16 in which the thermosetting resins are phenolic and polyester resins phenol-formaldehyde resin, urea and melamine formaldehyde resins, epoxy resins, unsaturated polyesters and polyurethanes.

19. A process as claimed in claim 16 in which a post formable resin is used.

20. A process as claimed in claim 1 in which the fibrous structure is consolidated by cutting into appropriate lengths and then heating and cooling under pressure.

21. A process as claimed in claim 1 which includes controlling the heat of the nip rolls to maintain them at a temperature below the plastics material melt temperature.

22. A process as claimed in claim 1 in which one of the nip rolls is driven at a speed equal to or faster than the web feed speed.

23. A process as claimed in claim 1 which includes passing the web before it cools through a further pair of nip rolls with a larger gap to meter the web and improve the surface finish.

* * * * *